United States Patent [19]

DeWoskin

[11] Patent Number: 4,586,128
[45] Date of Patent: Apr. 29, 1986

[54] ARBITRATOR CIRCUIT AND TECHNIQUE FOR USE IN A DIGITAL COMPUTING SYSTEM HAVING MULTIPLE BUS CONTROLLERS

[75] Inventor: Dale S. DeWoskin, San Marcos, Calif.

[73] Assignee: Burroughs Corporation, Detroit, Mich.

[21] Appl. No.: 485,044

[22] Filed: Apr. 14, 1983

[51] Int. Cl.[4] ............................................. G06F 13/18
[52] U.S. Cl. .................................. 364/200; 340/825.5
[58] Field of Search ... 364/200 MS File, 900 MS File; 328/152; 307/243; 340/825.5, 825.51

[56] References Cited

U.S. PATENT DOCUMENTS

| | | | |
|---|---|---|---|
| 4,229,791 | 10/1980 | Levy et al. | 364/200 |
| 4,245,307 | 1/1981 | Kapeghian et al. | 364/200 |
| 4,423,384 | 12/1983 | De Bock | 340/825.51 |
| 4,453,214 | 6/1984 | Adcock | 364/200 |
| 4,472,712 | 9/1984 | Ault et al. | 340/825.5 |

*Primary Examiner*—Eddie P. Chan
*Attorney, Agent, or Firm*—Charles J. Fassbender; Kevin R. Peterson

[57] ABSTRACT

In a digital computing system having multiple controllers, multiple memories and multiple memory interfaces, wherein each controller periodically requests access to a memory, an arbitrator device in the memory interfaces is disclosed, which includes circuitry for granting poll requests of the controllers in a prescribed manner of protocol. The arbitrator of this invention includes an input gating structure, a priority encoder, a poll request register and a grant register. During an arbitration cycle, upon reception of one or more active poll signals from the bus controllers, the respective grant signal of the highest priority active poll is immediately returned to the controller. All non-granted poll inputs are disabled so as to lock out any subsequent poll signals. This provides the granted controller exclusive use and control of the data bus between the controller and the memory interface.

7 Claims, 10 Drawing Figures

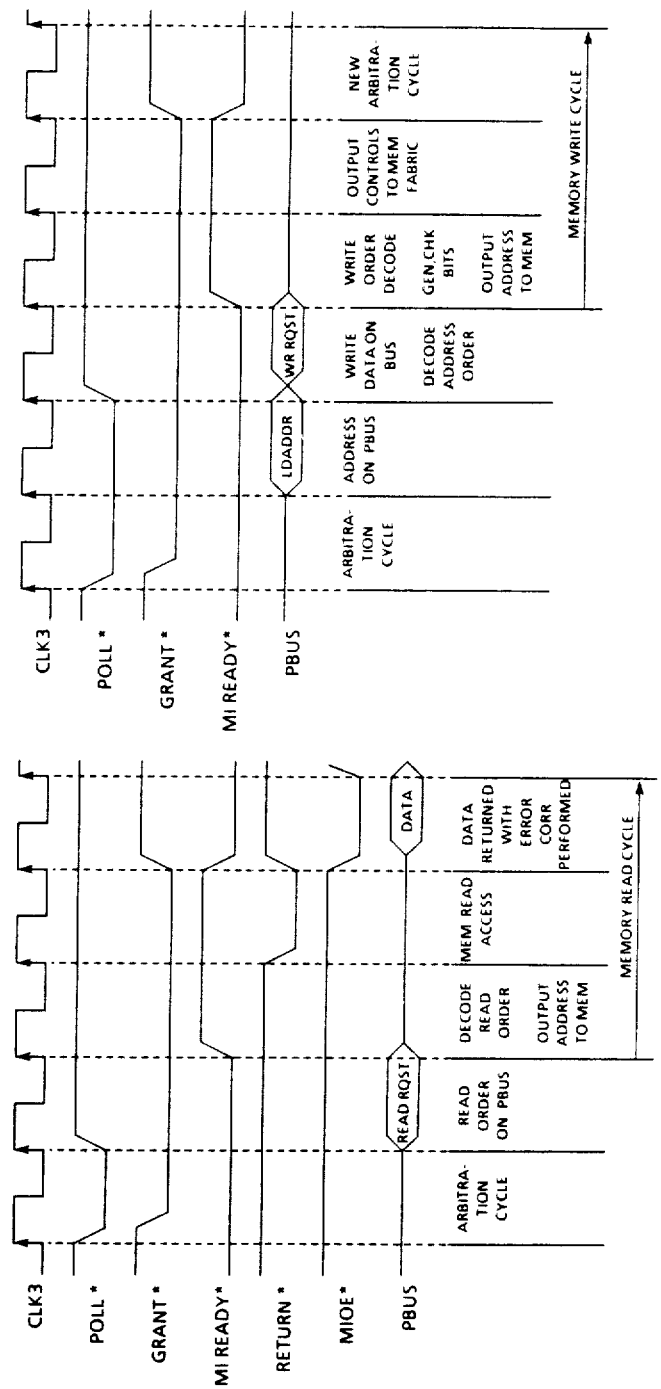

ARBITRATOR CIRCUIT AND TECHNIQUE FOR USE IN A DIGITAL COMPUTING SYSTEM HAVING MULTIPLE BUS CONTROLLERS

BACKGROUND OF THE INVENTION

This invention relates to digital computing systems, and more particularly to an arbitration device and scheme for use in such computing systems.

With the introduction of large scale integrated circuit technology, the modular building-block or component approach to digital computing systems has spurred the design of multiple component structures coupled to multiple buses for data and instruction transmission. In such multi-bus structures, more than one system component share a common memory over a common bus. Alternatively, more than one bus in a system may need access to a common memory; and, in such event each bus is coupled to a separate bus controller. Since only one bus controller can have access to the system memory at a time, a technique for resolving simultaneous requests among bus masters must be provided.

An exemplary prior art device for use with multi-microprocessors is disclosed in an article entitled "Bus Arbiter Streamlines Multiprocessor Design" by James Nadir and Bruce McCormick published in the June, 1980 issue of *Computer Design*.

SUMMARY OF THE INVENTION

In a digital computing system having multiple controllers and each controller periodically requests access to a memory, an arbitrator device is provided for granting poll requests of the controllers in a prescribed manner of protocol. The arbitrator of this invention comprises an input gating structure, a priority encoder, a poll request register and a grant register. More particularly, the input gating structure is disposed for receiving the poll requests from the controllers on a first set of input terminals and for receiving output signals of the arbitrator on a second set of input terminals. The priority encoder is coupled between the input gating structure and the poll request register and is disposed for selecting one poll request at a time from multiple poll requests in a prescribed manner of protocol. The poll request register is coupled between the priority encoder and the grant register and is disposed for storing a poll request from one of said controllers. The grant register stores the fact that a particular controller has been granted access to the memory and provides the grant output signals from the arbitrator. Moreover, the grant output signals are coupled back to the second set of input terminals of the input gating structure so as to lock out poll requests from the other controllers while one controller has been granted a poll request.

BRIEF DESCRIPTION OF THE DRAWINGS

FIG. 9 is a timing diagram illustrating a memory read request operation; and,

FIG. 10 is a timing diagram illustrating a memory write request operation.

DETAILED DESCRIPTION OF THE INVENTION

Figure 1:
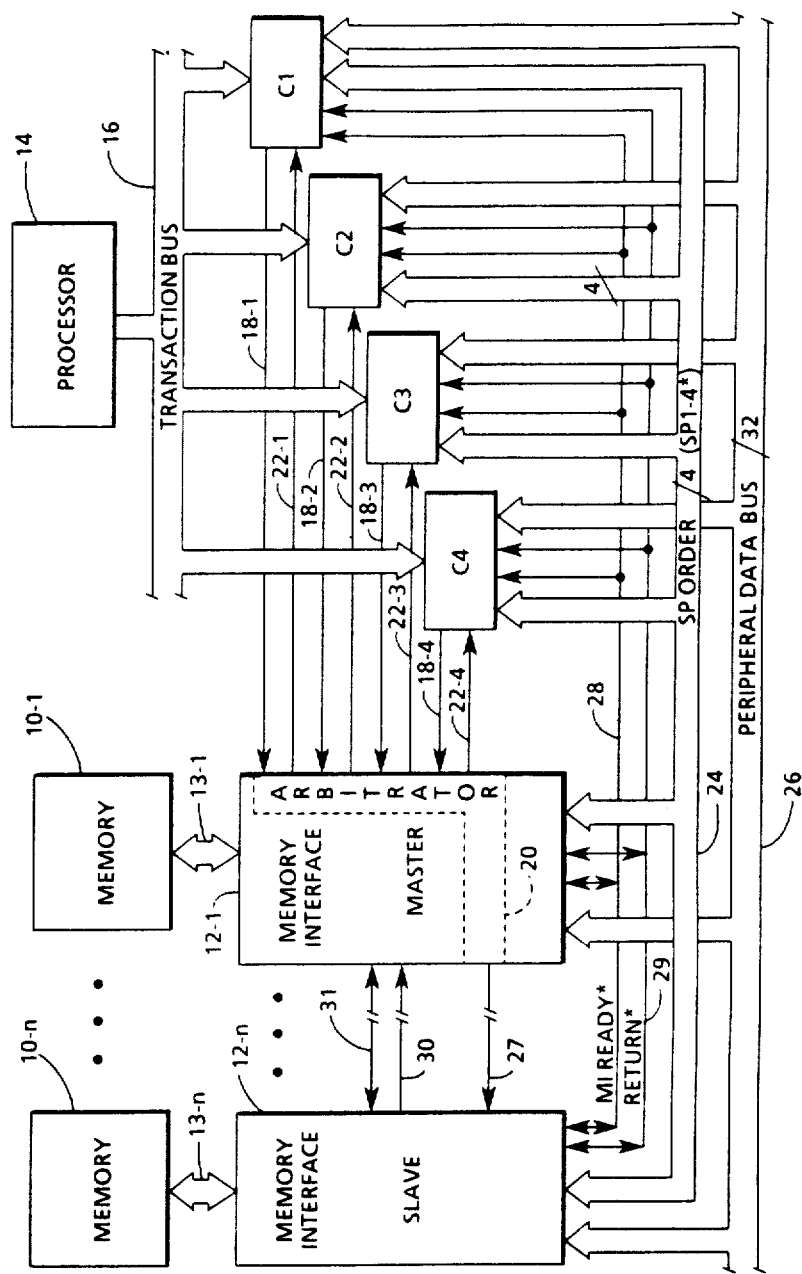
FIG. 1 is a block diagram of a digital computing system including a memory interface device that incorporates the present invention.

Referring now to the drawings, and in particular to FIG. 1, a block diagram of a digital computing system is shown that includes memory banks 10-1 . . . 10-$n$ which are coupled to the system by means of memory interface devices 12-1 . . . 12-$n$ through buses 13-1 . . . 13-$n$, respectively. The system includes a processor 14 coupled to a transaction bus 16, which transaction bus is coupled to memory controllers C1 through C4. It is the function of the controllers C1 through C4 to access one of the memories 10-1 . . . 10-$n$ by means of the memory interface devices 12-1 through 12-$n$. Preferably, one of the memory interface devices (e.g., 12-1) is designated as a master device and the remaining devices are slaved to this master as will be further explained hereinafter. Details of a processor suitable for processor 14 are illustrated and described in U.S. Pat. No. 4,346,438 entitled "Digital Computer Having Programmable Structure" by Hanan Potash et al; and details of a memory controller suitable for the controllers C1 through C4 are illustrated and described in U.S. Pat. No. 4,327,355 entitled "Digital Device with Interconnect Matrix" by Melvyn E. Genter et al.

In a typical operation, a controller, such as the controller C1, transmits a POLL signal on a line 18-1 of a set of POLL lines 18 to an arbitrator 20 within the memory interface device 12-1. It is the function of the arbitrator 20 to resolve any possible simultaneous requests among the other controllers for access to the memory, and to provide a GRANT signal on a line 22-1 of a set of GRANT lines 22 to the controller C1. When the arbitrator grants the controller C1 access to the memory, system protocol orders (SP 1-4*) are transmitted to the memory interface devices by means of an SP order bus 24. Flag signals representing the status of the memory interface devices are transmitted back to the controller C1 on the same SP order bus 24. Messages and data are transmitted over a peripheral data bus 26 disposed for coupling between the memory interface devices and the controllers.

In the described embodiment of the invention, a single peripheral data bus such as bus 26 contains a maximum of four controllers (e.g., controllers C1 through C4) and can accommodate up to eight memory interface devices. However, it is noted that any number of controllers or memory devices may be used without departing from the spirit and scope of the invention as claimed hereinbelow.

The eight memory interface devices perform as a single unit for executing memory POLL requests from a controller selected by the arbitrator. The interface devices communicate with only one controller at a time; therefore, it is necessary for the arbitrator to give the selected controller sole access to the memory interface device and inhibit all other controllers.

Each memory interface device has an on-board arbitrator, but only one such interface device, i.e. the master, has an active arbitrator unit. It is this active arbitrator which receives the POLL signals from the controllers, and provides a GRANT signal in response to a selected controller. Additionally, the master arbitrator such as arbitrator 20 provides a POLL active signal (POLLACT*) to the other slave interface devices on a line 27. For purposes of this description, an active low signal is designated herein by a superscript asterisk.

The arbitrator is active and is in an arbitration cycle when there are no POLL requests and no controller has been granted access to the peripheral bus. During an arbitration cycle, upon reception of one or more active POLL signals, the respective GRANT signal of the highest priority active POLL is immediately returned. POLL positions A through D define descending priority inputs (i.e., POLLA* equals the highest priority and POLLD* equals the lowest priority). Maximum clock frequency must allow sufficient time for the slowest controller to stabilize its POLL output signal and receive a stable GRANT signal. This requirement assures that at most only one active GRANT exists at the end of an arbitration cycle. If there is no active GRANT condition at the end of the cycle, then the arbitration cycle is reentered.

The arbitrator 20, on the cycle following return of an active GRANT, locks out all non-granted POLL inputs, and locks on the single active GRANT signal. This provides the granted controller exclusive use and control of the peripheral data bus 26, which lockout state remains in effect as long as the POLL signal from the selected controller remains active. To remain in this state, the controller must respond with a valid request type each time a ready signal (designated herein as MIREADY*) is supplied from the interface devices on a line 28 to the controllers. Once the MIREADY* signal is received by the controller, the system protocol orders (SP 1-4*) are transmitted to the memory interface device from the controller over the bus 24. If the memory interface device is to return data (i.e., all operations excluding a memory write operation), then the memory interface device transmits a RETURN* signal to the selected controller over a line 29.

When transmitting the last memory request, the granted controller must inactivate its POLL. Inactivation of the POLL for at least one cycle inhibits the memory interface device from commanding and receiving memory requests until after the next arbitration cycle is completed. Even though the POLL is inactivated, the associated GRANT remains locked on, via an inactive arbitrator unlock signal (ARBUNLK*) until execution of the last cycle of the last received memory request. Upon reaching the last execution cycle of the granted controller's last memory request, the interface device unlocks the arbitrator 20 by means of supplying the ARBUNLK* signal on a line 30. When this signal is active, an arbitration cycle is allowed to occur. During the last memory request execution cycle, an end-of-instruction signal (designated herein as EOI*) is communicated between the interface devices on a line 31.

Figure 2:
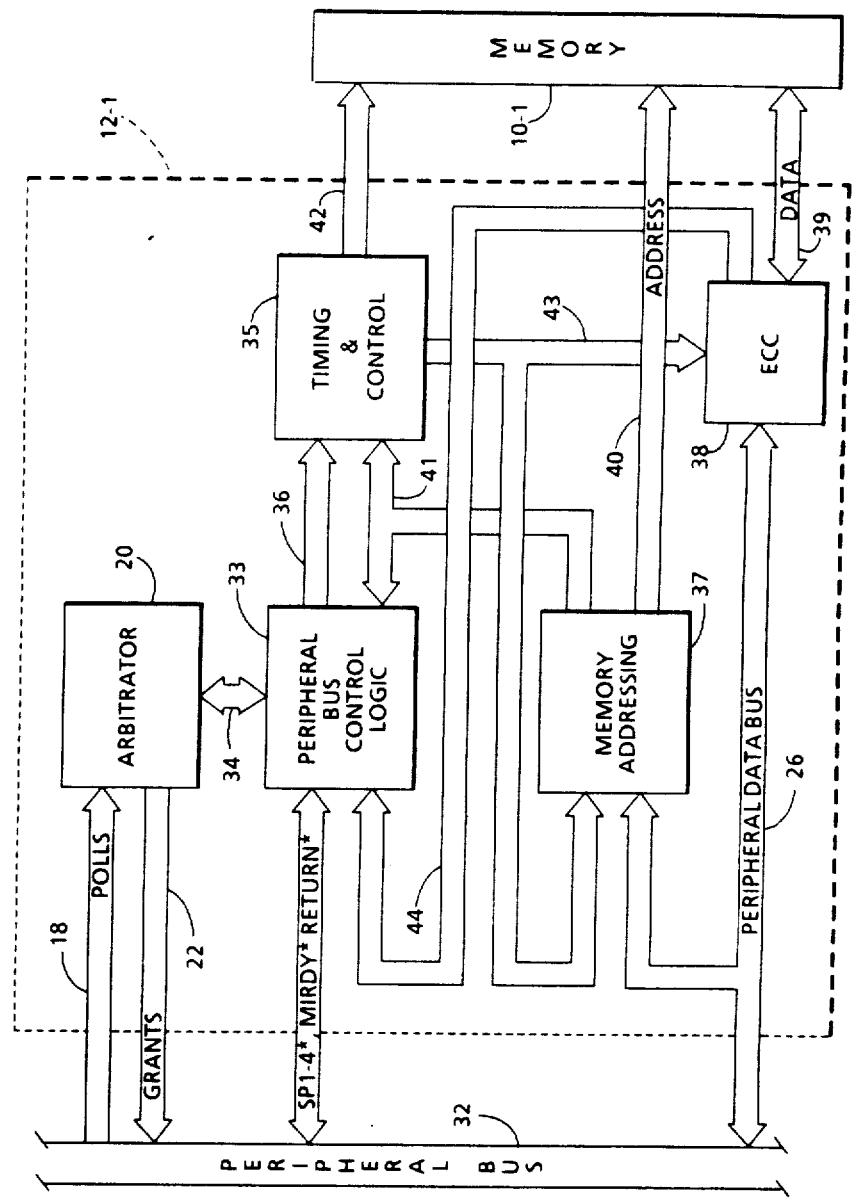
FIG. 2 is a block diagram of the memory interface device.

Referring now to FIG. 2, a block diagram of the memory interface device is shown. The POLL signals from the controllers C1 through C4 are supplied to the arbitrator 20 from a peripheral bus 32 on the lines 18, and the GRANT signals from the arbitrator 20 are supplied back to the peripheral bus 32 by means of the lines 22. The system protocol signal (SP 1-4*) lines 24 and the MIREADY* and RETURN* signal lines 28 and 29 are coupled to input terminals of a peripheral bus control logic 33. The peripheral bus 32 includes the peripheral data bus 26, the SP order bus 24, the POLL and GRANT lines 18 and 22, the MIREADY* signal line 28 and the RETURN* signal line 29 as shown in FIG. 1. Additional control signals are generated within the control logic 33 and are provided as inputs to the arbitrator logic 20 on lines 34, which control signals will be explained in greater detail hereinbelow. Additional timing and control signals are supplied to a timing and control sequencer 35 by means of lines 36. The sequencer 35, as will be shown in greater detail hereafter, comprises a state machine for sequentially cycling through various operations in response to inputs provided thereto.

The memory addressing logic 37 and error detection and correction circuitry 38 are illustrated in FIG. 2 as components of the memory interface device 12-1. In a conventional manner, which will not be described in greater detail hereinafter, data and addresses supplied on the peripheral bus 32 are presented to the memory addressing logic 37 and routed through the error detection and correction circuitry 38 on the peripheral data bus 26. The addresses from the memory addressing logic 37 are supplied to the memory 10-1 on an address bus 40 from the same peripheral bus 32. Status signals generated within the memory addressing logic 37 are supplied to the sequencer 35 by means of lines 41. The sequencer 35 provides timing and control signals for the memory 10-1 on lines 42 and for the memory interface device on lines 43. The structure and operation of the device shown in the general block diagram of FIG. 2 and briefly outlined above will be more fully appreciated following the detailed description below of each of the constituent blocks.

Figure 3:
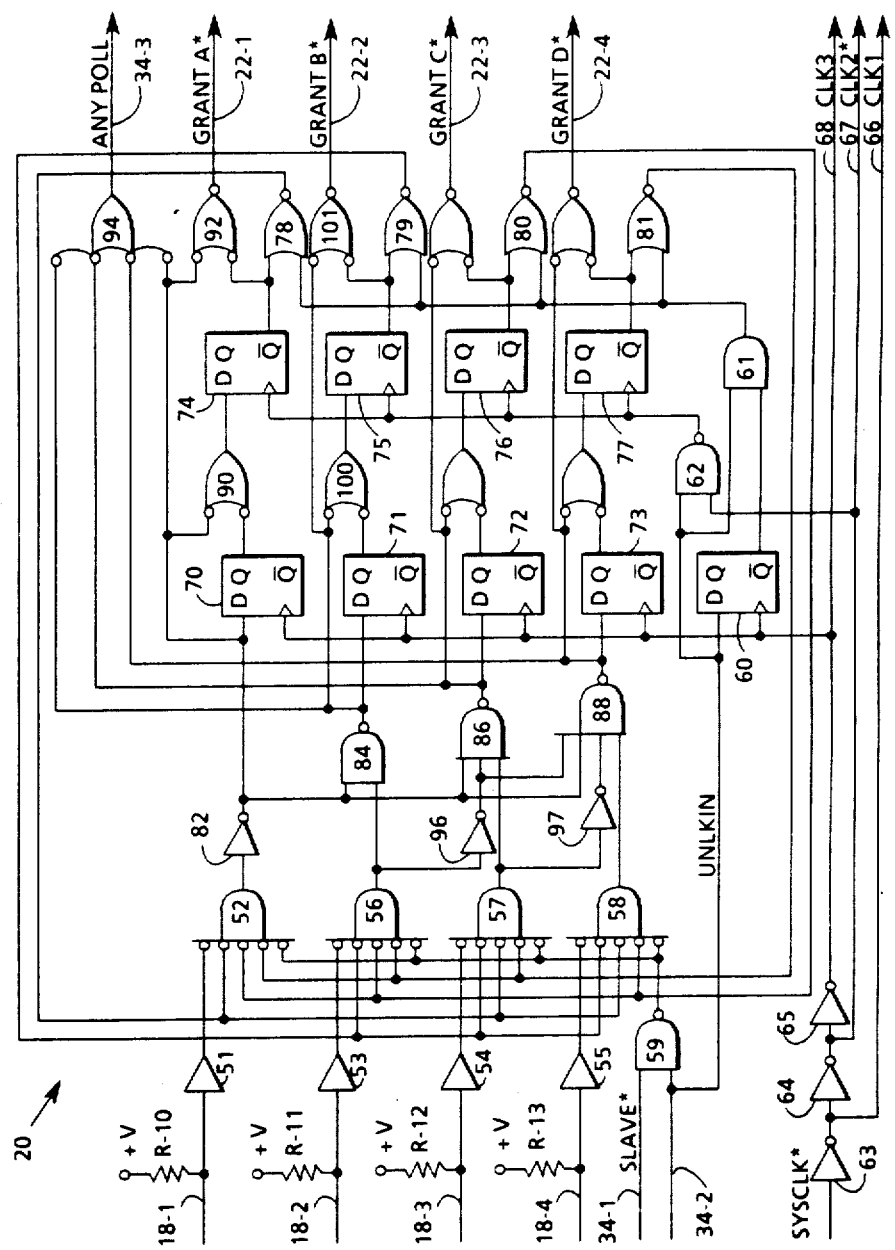
FIG. 3 is a logic diagram of the arbitrator of the present invention.

A detailed logic diagram of the arbitrator 20 is shown in FIG. 3. The POLLA* signal supplied on the line 18-1 from the controller C1 is coupled to the input of a buffer 51 and the output thereof is coupled to an inverting input of an AND gate 52. The POLL signals are active low. Thus, it is necessary to bias the input lines such as line 18-1 to a positive voltage by means of a resistor, R10 coupled to a voltage source. The line 18-1 is also coupled to the input terminal of a buffer 51, and the output terminal of this buffer is coupled to an inverting input terminal of an AND gate 52. The remaining POLL signal lines 18-2, 18-3, and 18-4 are coupled in a similar manner to resistors R11 through R13 and to the inputs of buffers 53 through 55, respectively; and, the output of these buffers are coupled to inverting input terminals of AND gates 56 through 58. A SLAVE* signal, representing that the present arbitrator is a master or slave device in the system, which is generated within the peripheral bus control logic 32, is coupled to one of two input terminals of a NAND gate 59 on a line 34-1. The UNLKIN signal, which unlocks the arbitrator for operation, is generated in the logic 33 is coupled to the second input terminal of the NAND gate 59 on a line 34-2. The output terminal of this NAND gate is coupled to a second inverting input terminal of each of the AND gates 52, and 56 through 58.

The UNLKIN signal line is also coupled to the data D input terminal of a flip-flop 60, to one of two input terminals of an AND gate 61, and to one of two input terminals of a NAND gate 62. A system clock signal (SYSCLK*) is supplied to the input terminal of an inverter 63, the output terminal of which is coupled to the input terminal of a second inverter 64 and the output terminal of this inverter is coupled to an input terminal of yet another inverter 65. The output terminal of the inverter 63 is the CLK 1 clock signal supplied on a line 66, the output of the inverter 64 is an inverted CLK 2* clock signal supplied on a line 67, and the output of the inverter 65 is the CLK 3 clock signal supplied on a line 68. All three of these clock signals are shifted slightly in time as a function of the gate delays caused by each of the inverters. The CLK 3 clock signal is supplied to the clock input terminal of the flip-flop 60 and to clock input terminals of flip-flops 70 through 73, which comprise the POLL register described further hereinafter. The output terminal of the NAND gate 62 is coupled to clock input terminals of flip-flops 74 through 77, which comprise the GRANT register to be described further hereinafter. The output terminal of the AND gate 61 is coupled to one of two input terminals of NOR gates 78 through 81.

The output terminal of the NOR gate 78 is coupled back to a third inverting input terminal of AND gates 56, 57, and 58. It is the function of this latch-back connection from the NOR gate 78 to disable the AND gates 56, 57 and 58, so as to lock out any further POLL requests. Similarly, the output terminal of the NOR gate 79 is coupled back to third inverting input terminals of AND gates 52, 57 and 58. The output terminal of the NOR gate 80 is coupled to inverting input terminals of the AND gates 52, 56 and 58. And finally, the output of the NOR gate 81 is coupled to inverting input terminals of the AND gates 52, 56 and 57.

The output terminal of the AND gate 52 is coupled to the input of an inverter 82 and the output of this inverter is coupled to the data D input terminal of the flip-flop 70, to the first of two input terminals of a NAND gate 84, to one of three input terminals of a NAND gate 86, and to one of four input terminals of a NAND gate 88. In addition, the output terminal of the inverter 82 is coupled to one of two inverting input terminals of an OR gate 90 to one of two inverting input terminals of a NOR gate 92, and to one of four inverting input terminals of an OR gate 94. The output of the AND gate 56 is coupled to the input of an inverter 97 and to the second input terminal of the NAND gate 84. The output of the inverter 97 is coupled to a second input terminal of the NAND gate 86 and to the second input terminal of the NAND gate 88.

The output terminal of the AND gate 57 is coupled to the input of an inverter 98, and the output of this inverter is coupled to the third input of the NAND gate 88. The output of the AND gate 58 is coupled to the fourth input terminal of the NAND gate 88. The inverters 82, 97 and 98 and the NAND gates 84, 86 and 88 are configured to form a priority encoder. That is, if two POLL request signals arrive within the same arbitration clock signal (e.g., POLLA* and POLLB*) the POLLA* request signal has priority and will override the POLLB* request signal.

The flip-flops 70 through 73 form a POLL request register that stores the results of the priority encoder. For example, if a POLLB* request enables the AND gate 56 such that the output thereof is at a high level, the NAND gates 86 and 88 are disabled such that the outputs thereof are at a high level and the output of the NAND gate, 84 is at a low level. At the same time, the AND gate 52 is off which provides a high level output of the inverter 82. Accordingly, on the leading edge of the CLK 3 signal, flip-flops 70, 72 and 73 will be turned on and the flip-flop 71 is turned off. At the same time (on the same clock edge) the output of NAND gate 84 is at a low level, which causes the output of an OR gate 100 to go to a high level and the output of a NOR gate 101 to go to a low level.

The output of the OR gate 100 is applied at the data (D) input terminal of the flip-flop 75. On the same clock edge that the flip-flop 71 is turned off, the flip-flop 75 is set and the not true (Q*) output terminal thereof goes to a low level. This not true (Q*) output terminal of the flip-flop 75 is coupled to the second inverting input terminal of the NOR gate 101 such that this flip-flop will hold the GRANTB* signal at its active low level even after the POLLB* signal goes inactive high. Under this set condition of the flip-flop 75, the output of the NOR gate 79 is also held at a high level thereby disabling the AND gates 52, 57, and 58. Thus, any subsequent POLLA*, POLLC* or POLLD* signals are locked out.

Figure 4:
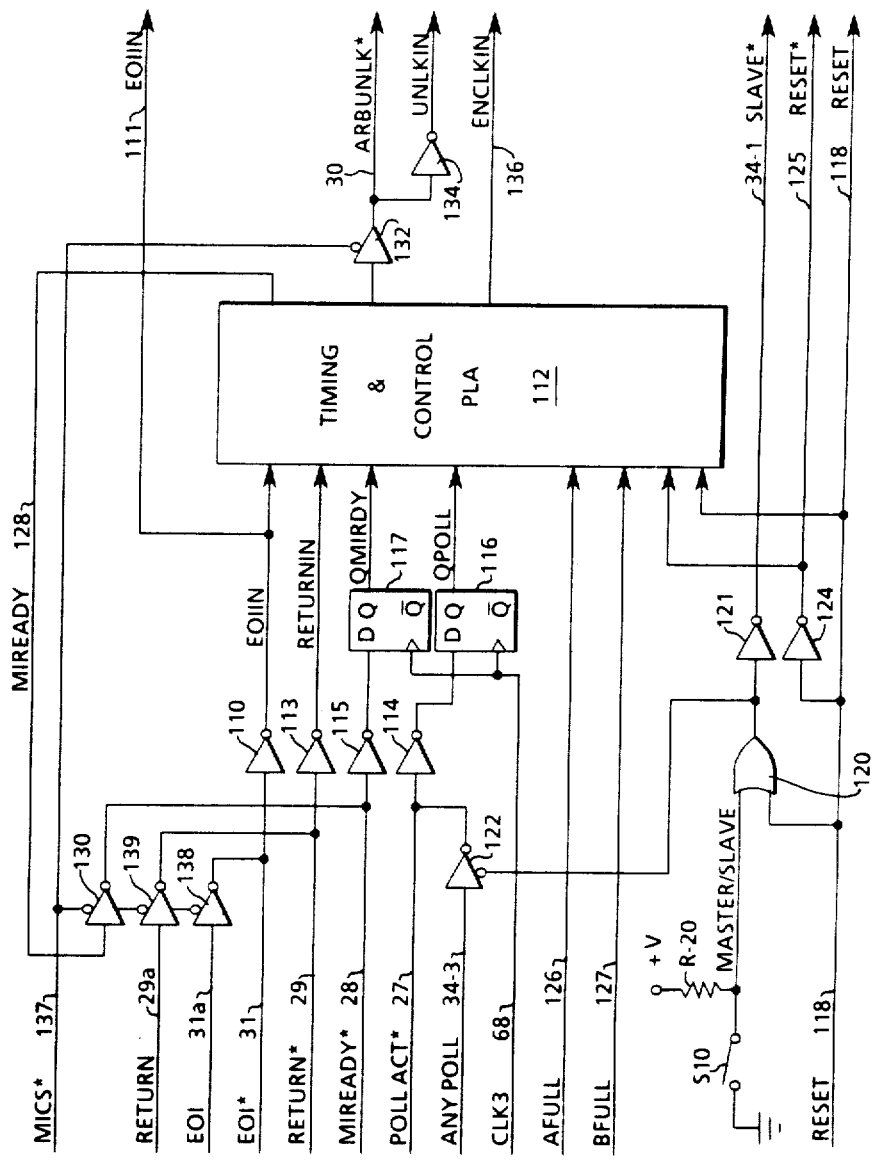
FIG. 4 is a logic diagram of the peripheral bus control logic of the memory interface device.
Figure 5:
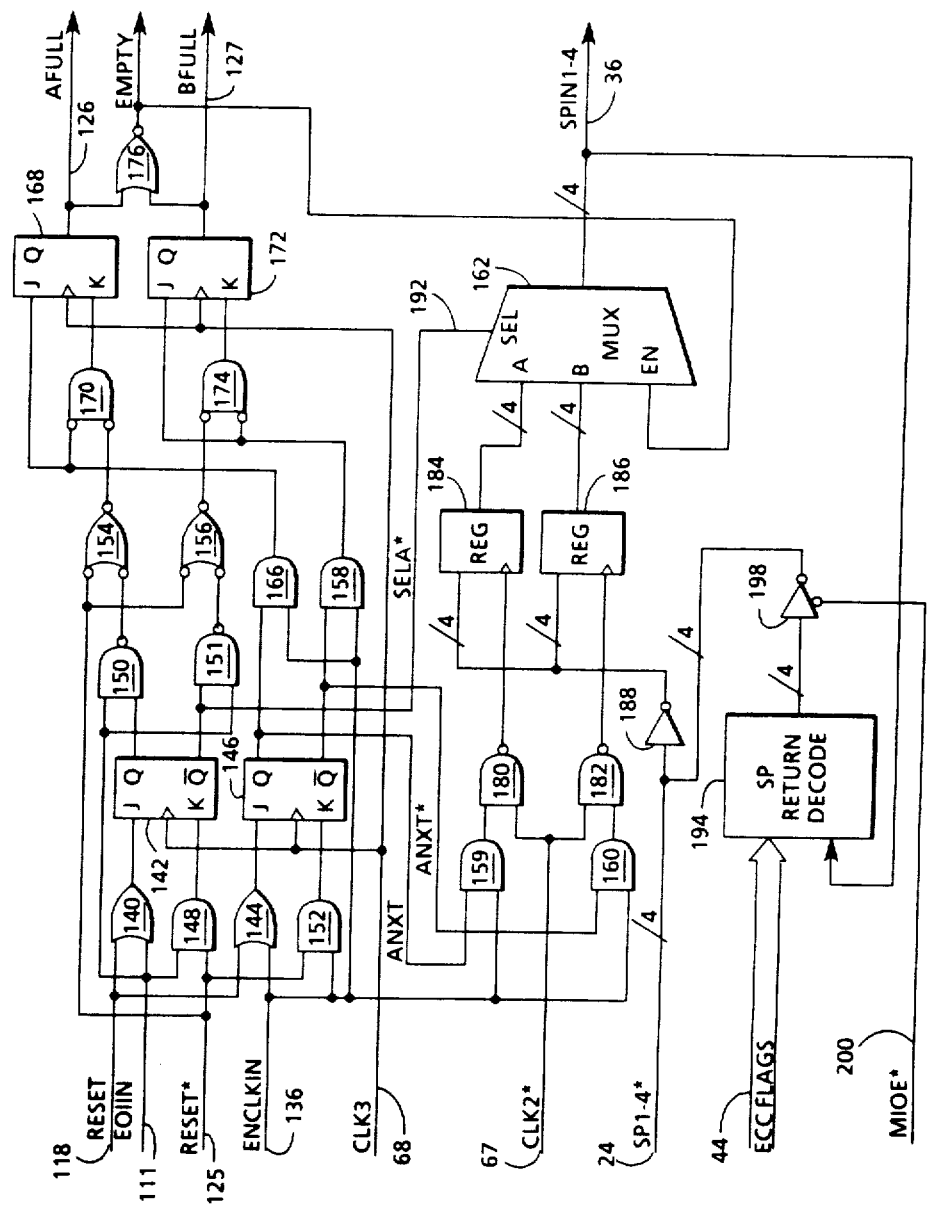
FIG. 5 is a schematic of the register flag logic, request register logic, and system protocol decode circuitry for the peripheral bus control logic.

The details of the peripheral bus control logic 33 are illustrated in FIGS. 4 and 5. With specific reference to FIG. 4, the end-of-instruction signal (EOI*) supplied on the line 31 between the memory interface devices 12-1 . . . 12-n is coupled to the input of an inverter 110 and the output thereof is designated herein as the EOIIN signal which is supplied to the input of a timing and control PLA 112. In a similar manner, the RETURN* signal supplied on the line 29 is coupled to the input of an inverter 113 and the output thereof (designated herein as RETURNIN) is coupled to the PLA 112. The POLLACT* and the MIREADY* signals supplied on the lines 27 and 28 are coupled to input terminals of inverters 114 and 115, respectively, and the outputs thereof are coupled to flip-flops 116 and 117, respectively. The true output terminals of the flip-flops 116 and 117 are coupled to additional input terminals of the PLA 112, and the output signals from these flip-flops are referred to herein as QPOLL and QMIREADY, respectively. The flip-flops 116 and 117 are clocked by the CLK 3 signal supplied on the line 68.

A RESET signal supplied on a line 118 from the peripheral bus 32 is coupled to one of two input terminals of an OR gate 120. As stated hereinabove, any given memory interface device 12-1 . . . 12-n may be selected as a master device; but, only one can be the master. There are numerous conventional techniques known in the art for accomplishing this. For example, a device input pin may be connected to a voltage or to ground potential, which is represented schematically in FIG. 4 by a switch S-10. In particular, the operating terminal of the switch is connected to ground potential and the normally-open terminal is coupled to a positive potential through a resistor R-20. The normally-open terminal is also coupled to the second input terminal of the OR gate 120. Hence, when the switch S-10 is closed, the device pin is grounded making the device a master. Conversely, if the switch S-10 is open the device becomes a slave.

The output terminal of the OR gate 120 is coupled to the input terminal of an inverter 121 and the output thereof is the SLAVE* signal supplied on the line 34-1. The output of the OR gate 120 is also coupled to an enabling input terminal of a tri-state inverter 122. The RESET signal supplied on the line 118 is also coupled to an input terminal of the timing and control PLA 112 and to the input terminal of an inverter 124. The output of the inverter 124 is the RESET* signal supplied on line 125, which is also coupled to the PLA 112. Two signals indicative of input registers being full, which signals will be explained in greater detail hereinafter, are provided as inputs to the PLA 112 on lines 126 and 127.

A first output signal from the timing and control PLA 112 is the MIREADY signal supplied on a line 128 to the input of a tri-state inverter 130. The output of the inverter 130 is coupled to the line 28 transmitting the MIREADY* signal. A second output signal from the PLA 112 is the arbitrator unlock signal which is supplied to the input of a tri-state buffer 132. The output terminal of this buffer is coupled to the line 30 transmitting the ARBUNLK* signal. The output of the buffer 132 is also coupled to the input of an inverter 134 and the output of this inverter is coupled to the line 34-2 transmitting the UNLKIN signal between the bus control logic 33 and the arbitrator 20. The last illustrated output signal from the PLA 112 supplied on a line 136 is the enabled clock input signal ENCLKIN, which will be used in the circuitry described hereafter.

A device enable signal, which is referred to herein as MICS* (memory interface chip select), is supplied on a line 137 to enabling input terminals of the tri-state buffer 132, the tri-state inverter 130 and a pair of additional tri-state inverters 138 and 139. It is the function of the inverters 138 and 139 to isolate the internal-device versions of the EOI and RETURN signals from those same signals inverted and transmitted on the lines 29 and 31.

The PLA 112 is of conventional design and in this embodiment is programmed to operate in accordance with the following equations:

ARBUNLK = Q POLL + [(AFULL* + BFULL*) · EOIIN] + (AFULL* · BFULL*)
ENCLKIN = QMIRDY · QPOLL · RESET*
MIREADY = RESET* · RETURN IN* · [(AFULL* · BFULL*) + ((AFULL* + BFULL*) QMIRDY* · Q POLL) + ((AFULL* + BFULL*) QMIRDY · Q POLL · EOIIN) + (AFULL · BFULL · EOIIN · QPOLL) + ((AFULL* + BFULL*) QMIRDY* · EOIIN)]

Referring now to FIG. 5, a logic diagram of the flag logic, request register logic and SP order decode for the peripheral bus control logic 33 is illustrated. The RESET signal and the EOIIN signals are coupled to the two input RESET signal is also coupled to one of two input terminals of an OR gate 144 and the output terminal of this OR gate is coupled to the J input terminal of a JK flip-flop 146. The EOIIN input signal is also coupled to one of two input terminals of an AND gate 148 and to one of two input terminals of NAND gates 150 and 151. The output terminal of the AND gate 148 is coupled to the K input terminal of the JK flip-flop 142.

The RESET* signal is coupled to the second input terminal of the AND gate 148, to one of two input terminals of an AND gate 152, to one of two inverting input terminals of NOR gates 154 and 156. The enable clock signal (ENCLKIN) supplied on the line 126 is coupled to the second input terminals of the OR gate 144 and the AND gate 152, to one of two input terminals of AND gates 158, 159 and 160. The clock input terminals of the flip-flops 142 and 146 are coupled to the line 68 transmitting the CLK 3 clock signal.

The true (Q) output terminal of the flip-flop 142 is coupled to the second input terminal of the NAND gate 150, and the not true (Q*) output terminal thereof is coupled to the second input terminal of the NAND gate 151 and to the select SEL input terminal of a multiplexor 162.

The true (Q) output terminal of the flip-flop 146 is coupled to one of two input terminals of the AND gate 166 and to the second input terminal of the AND gate 159. The not true (Q*) output terminal of the flip-flop 146 is coupled to the second input terminals of the AND gates 158 and 160.

The output terminal of the AND gate 166 is coupled to the J input terminal of a JK flip-flop 168 and to one of two inverting input terminals of an AND gate 170. The output terminal of the NOR gate 154 is coupled to a second inverting input terminal of the AND gate 170, and the output of this AND gate is coupled to a K input terminal of the JK flip-flop 168.

The output terminal of the AND gate 158 is coupled to the J input terminal of a flip-flop 172 and to one of two inverting input terminals of an AND gate 174. The output terminal of the NOR gate 156 is coupled to the second inverting input terminal of the AND gate 174 and the output terminal of this AND gate is coupled to the K input terminal of the flip-flop 172. The flip-flops 168 and 172 are clocked by the CLK 3 clock signal supplied on the line 68.

The true (Q) output terminal of the JK flip-flop 168 is coupled to the line 126 transmitting the AFULL signal to the PLA 112 (FIG. 4). Also, this same Q output terminal is coupled to one of two input terminals of a NOR gate 176. The true Q output terminal of the JK flip-flop 172 is coupled to the line 127 transmitting the BFULL signal to the PLA 112 and is also coupled to the second input terminal of the NOR gate 176.

The output terminal of the AND gate 159 is coupled to one of two input terminals of the NAND gate 180 and the output terminal of the AND gate 160 is coupled to one of two input terminals of a NAND gate 182. The second input terminals of the NAND gates 180 and 182 are coupled to the line 67 transmitting the CLK 2* clock signal.

The output terminal of the NAND gate 180 is coupled to the clock input terminals of a register 184, and the output of the NAND gate 182 is coupled to the clock input terminals of a similar register 186. The registers 184 and 186 store the SP orders (SP 1-4*) transmitted on the line 24 through a set of four inverters collectively referred to herein by a single inverter 188. It should be noted that the lines 24 in the illustrated embodiment comprise four separate lines, which for purposes of simplification are represented herein as a single line.

The outputs of the registers 184 and 186 are coupled to A and B input terminals respectively of the multiplexor 162. The EMPTY signal transmitted on a line 177 from the NOR gate 176 is coupled to the output enable terminal of the multiplexor 162. A SELA* signal transmitted on a line 192 from the flip-flop 142 is coupled to the selector input terminal of the multiplexor 162. The output terminals of the multiplexor 162 are coupled to the lines 36 for transmitting the SP orders to the timing and control logic 35 (FIG. 2). In addition, the four output lines from the multiplexor 162 are coupled to input terminals of an SP return order decode 194. The decode 194 can be built by the use of a ROM, PROM, or PLA in a well known conventional manner. Error correction and detection status flag signals are supplied on the lines 44 to the decode 194 for influencing the decode operation. It is the function of the decode 194 to decode the SP orders in accordance with the following table:

| SP ORDER 4321 | MI TO CONTROLLER |
|---|---|
| 0000 | No Return |
| 0011 | Address Value Returned |
| 0100 | Data Returned, No Error |
| 1101 | Data Returned, Single Error |
| 1110 | Date Returned, Multiple Error |

Additional codes can be used for other operations not described herein, which are beyond the scope of the claimed invention.

Figure 7:
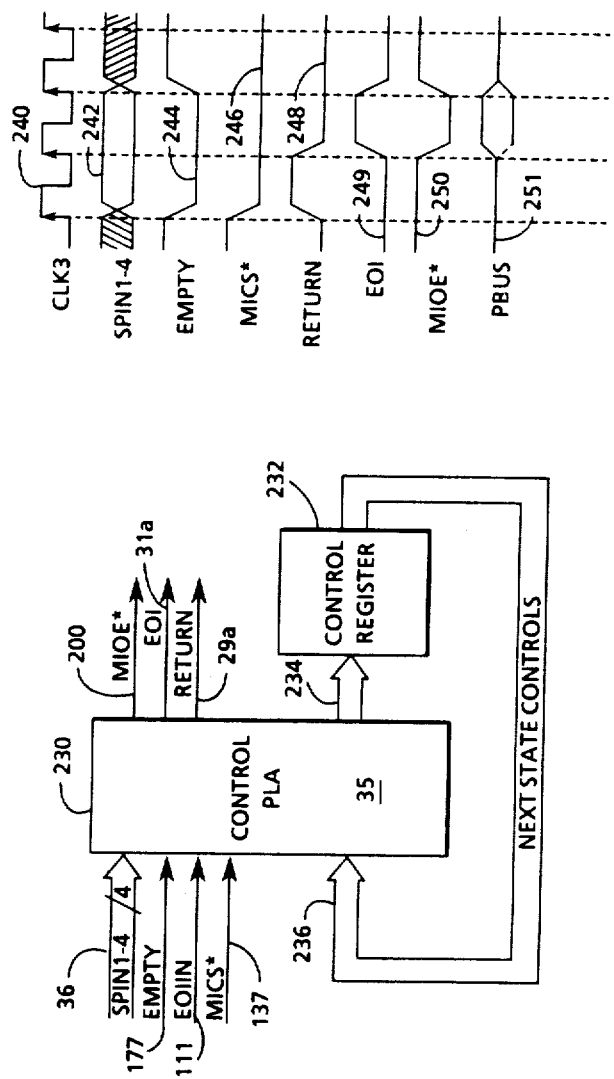
FIG. 7 is a logic diagram of the timing and control sequencer for the memory interface device.

The output terminals from the decode 194 are coupled on lines 198 to a group of four inverters represented herein by a single tri-state inverter 198 (for simplification purposes only), and the output terminals of the inverters 198 are coupled to the lines 24. The tri-state inverters 198 are controlled by the memory interface output enable signal MIOE* transmitted on a line 200 from the control sequencer PLA as illustrated in FIG. 7 and described further hereinafter.

Figure 6:
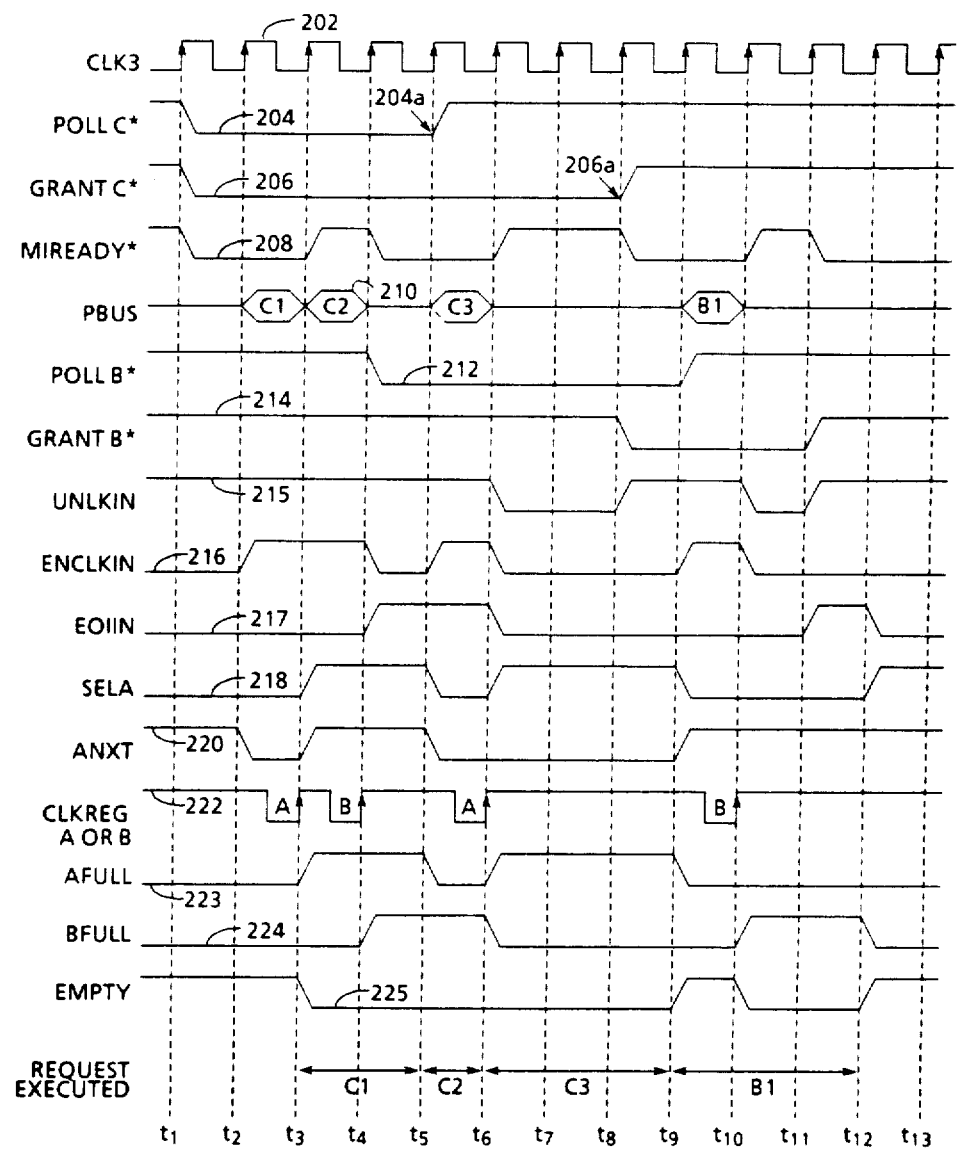
FIG. 6 is a timing diagram illustrating operation of the arbitrator of this invention.

The operation of the circuitry described hereinabove may be more fully appreciated with reference to the timing diagram shown in FIG. 6, wherein the CLK 3 clock signal is illustrated by a waveform 202. Assume, for example, that a POLLC* signal is supplied on the line 18-3 (waveform 204) from the controller C3 and a GRANTC* signal is supplied back to this controller on the line 22-3 (waveform 206). The controller C3 now has exclusive use and control of the peripheral data bus 26 so long as the POLLC* signal remains active. When the POLLC* signal is inactivated at point 204a, the GRANTC* signal is held in an active low state until one cycle prior to execution of the last request at point 206a.

At the same time that the GRANTC* signal goes to a low level, the MIREADY* signal drops to a low level (waveform 208), which active low signal is transmitted back to the controller C3 on the line 28. Waveform 210 represents requests with associated data being transferred on the peripheral bus 32 (C1, C2 and C3) in response to the above-described POLL-GRANT. Waveforms 212 and 214 represent another POLL-GRANT interaction by the controller C2, and portion Bl of the waveform 210 represents data being transferred on the bus 32 in response to the POLLB*-GRANTB* interaction. Waveform 215 represents the unlock-in (UNLKIN) signal appearing on the line 34-2 (FIG. 3).

Waveform 216 represents the enable clock-in ENCLKIN signal supplied on the input line 126 (FIG. 5); waveform 217 represents the end-of-instruction-in signal (EOIIN) appearing on the input line 111; waveform 218 represents the select A signal (SELA) appearing at the true (Q) output terminal of the JK flip-flop 142; and waveform 220 represents the A Next signal (ANXT) appearing at the true (Q) output terminal of the JK flip-flop 146. Waveform 222 is a composite diagram representing both the clock signals at the clock input terminals of the registers 184 and 186 (FIG. 5), wherein waveform portions labeled A or B designate either the register 84 or 186, respectively, is clocked.

Waveforms 223 and 224 represent the AFULL and BFULL signals supplied on the lines 126 and 127, respectively; while waveform 225 represents the EMPTY signal supplied at the output terminal of the NOR gate 176.

Referring now to FIG. 7, a logic diagram of the timing and control sequencer 35 is shown comprising a control PLA 230 and a control register 232. The SPIN1-4 order signals transmitted on the lines 41 are provided as input signals to the control PLA 230. In addition, the EMPTY signal supplied on the line 177 from the NOR gate 176 (FIG. 5); the end-of-instruction-in signal (EOIIN) signal supplied on the line 111 from the inverter 110 (FIG. 4); and, the chip select signal (MICS*) supplied on the line 137 are all provided as input signals to the PLA 230. The control PLA 230 is of conventional design and is disposed for providing the MIOE* on the line 200, and the internal EOI and RETURN signals on the lines 31a and 29a, respectively.

As stated hereinabove, the control PLA and the control register 232 comprise a sequencer. That is, the output signals from the PLA are not only a function of the above-stated input signals but also the last state of the PLA. To this end, output signals from the PLA 230 are supplied to the register 232 on lines 234. The output of the register 232 is coupled back to additional input terminals of the PLA 230 on lines 236.

Figure 8:
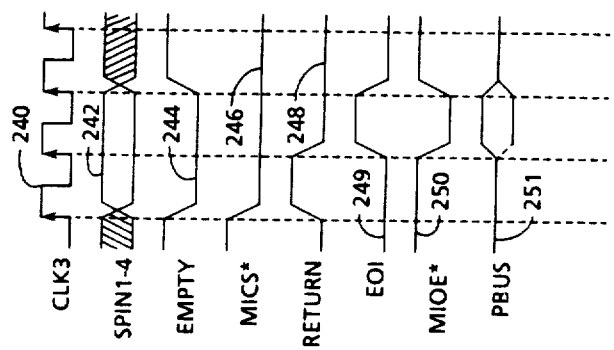
FIG. 8 is a timing diagram illustrating operation of the control sequencer.

The operation and function of the sequencer 35 may be more fully appreciated with reference to the timing diagram of FIG. 8, wherein waveform 240 represents the CLK 3 clock signal. Waveform 242 represents the SPIN1-4 signals supplied on the lines 41. Waveform 244 represents the EMPTY signal supplied on the line 177, while waveform 246 represents the MICS* chip select signal supplied on the line 137. Waveforms 248 and 249 represent the internal signals RETURN and EOI, respectively. Waveform 250 represents the memory interface output enable signal (MIOE*) supplied on the line 200.

FIGS. 9 and 10 illustrate a memory read and write request, respectively. The waveforms in these timing diagrams are the same as those described hereinabove with reference to FIGS. 6 and 8.

While the invention has been particularly shown and described with reference to preferred embodiments thereof, it will be understood by those skilled in the art that the foregoing and other changes in form and details may be made therein without departing from the spirit and scope of the invention.

I claim:

1. In a digital computing system having multiple controllers of a type where each controller periodically sends request signals to access a memory, an arbitrator device for receiving the request signals and for generating grant signals which permit access of the controllers to said memory one at a time, saod arbitrator comprising:

an input gating structure means for receiving said grant signals and said request signals from the controllers on a set of input terminals and for passing each received request signal to a respective output terminal subject to a respective condition, the condition being that a request signal from any one particular controller is inhibited from passing by a grant signal to any other controller;

a priority encoder means for selecting one request signal at a time in accordance with a prescribed manner of protocol from those request signals that are passed to the output terminals of said input gating structure means; said priority encoder having input terminals coupled to said output terminals of said input gating structure means;

a request register means having input terminals coupled to output terminals of said priority encoder means, for storing the one request signal selected by said priority encoder means;

a first ORing means for generating signals as the logical OR of the one request signal stored in said request register means with the one request signal selected by said priority encoder means;

a grant register means having input terminals coupled to said first ORing means for storing the logical OR signal therefrom; and a second ORing means for supplying said grant signals to said controllers and to said input gating structure as the logical OR of said logical OR signal stored in said grant register means with the one request signal selected by said priority encoder means.

2. An arbitrator as in claim 1 further including means for selecting said arbitrator as a master unit in a group of interconnected arbitrators.

3. An arbitrator as in claim 1 further including means for generating a ready signal for transmission to a requesting controller that has been granted access when an arbitration cycle has been completed.

4. An arbitrator as in claim 1 in combination with means for generating an arbitrator unlocking signal to said input gating structure means in response to said request signal from said controllers.

5. In a digital computing system having multiple controllers, multiple memories and multiple interface circuits to each of said memories with each controller being of a type which periodically sends request signals to access a memory, an arbitrator device in each of said interface circuits for receiving the request signals and for generating grant signals which permit access of the controllers to said memories in a prescribed manner of protocol, each of said arbitrators comprising:

means for selecting one of said arbitrators as a master unit and disabling the remaining arbitrators;

an input gating structure means for receiving said grant signals and said request signals from the controllers on a set of input terminals and for passing each received request signal to a respective output terminal subject to a respective condition, the condition being that a request signal from any one particular controller is inhibited from passing by a grant signal to any other controller;

a priority encoder means for selecting one request signal at a time in accordance with a prescribed manner of protocol from those request signals that are passed to the output terminals of said input gating structure means; said priority encoder having input terminals coupled to said output terminals of said input gating structure means;

a request register means having input terminals coupled to output terminals of said priority encoder means, for storing the one request signal selected by said priority encoder means;

a first ORing means for generating signals as the logical OR of the one request signal stored in said request register means with the one request signal selected by said priority encoder means;

a grant register means having input terminals coupled to said first ORing means for storing the logical OR signal therefrom; and a second ORing means for supplying said grant signals to said controllers and to said input gating structure as the logical OR of said logical OR signal stored in said grant register means with one request signal selected by said priority encoder means.

6. An arbitrator as in claim 5 further including means for generating a ready signal for transmission to a requesting controller that has been granted access when an arbitration cycle has been completed.

7. An arbitrator as in claim 5 in combination with means for generating an arbitrator unlocking signal to said input gating structure means in response to said request signals from said controllers.

* * * * *